A. EPPLER.
INSEAM TRIMMING MACHINE.
APPLICATION FILED MAR. 23, 1916.
1,226,872.
Patented May 22, 1917.
6 SHEETS—SHEET 6.
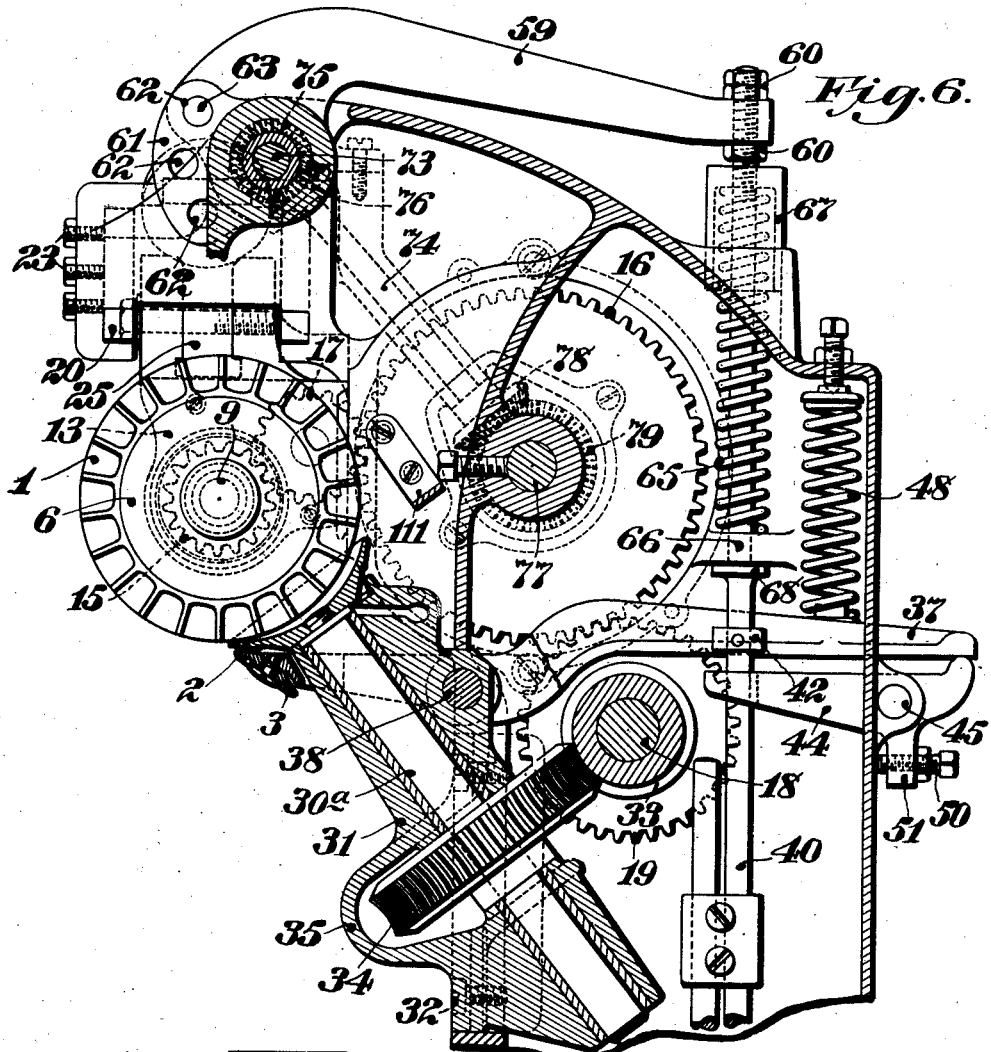
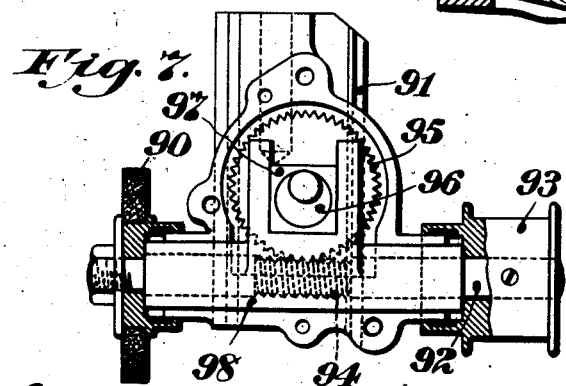
Witness:
E. C. Wurdeman
Inventor:
Andrew Eppler
by his Attorneys
Phillips Van Evers & Fish

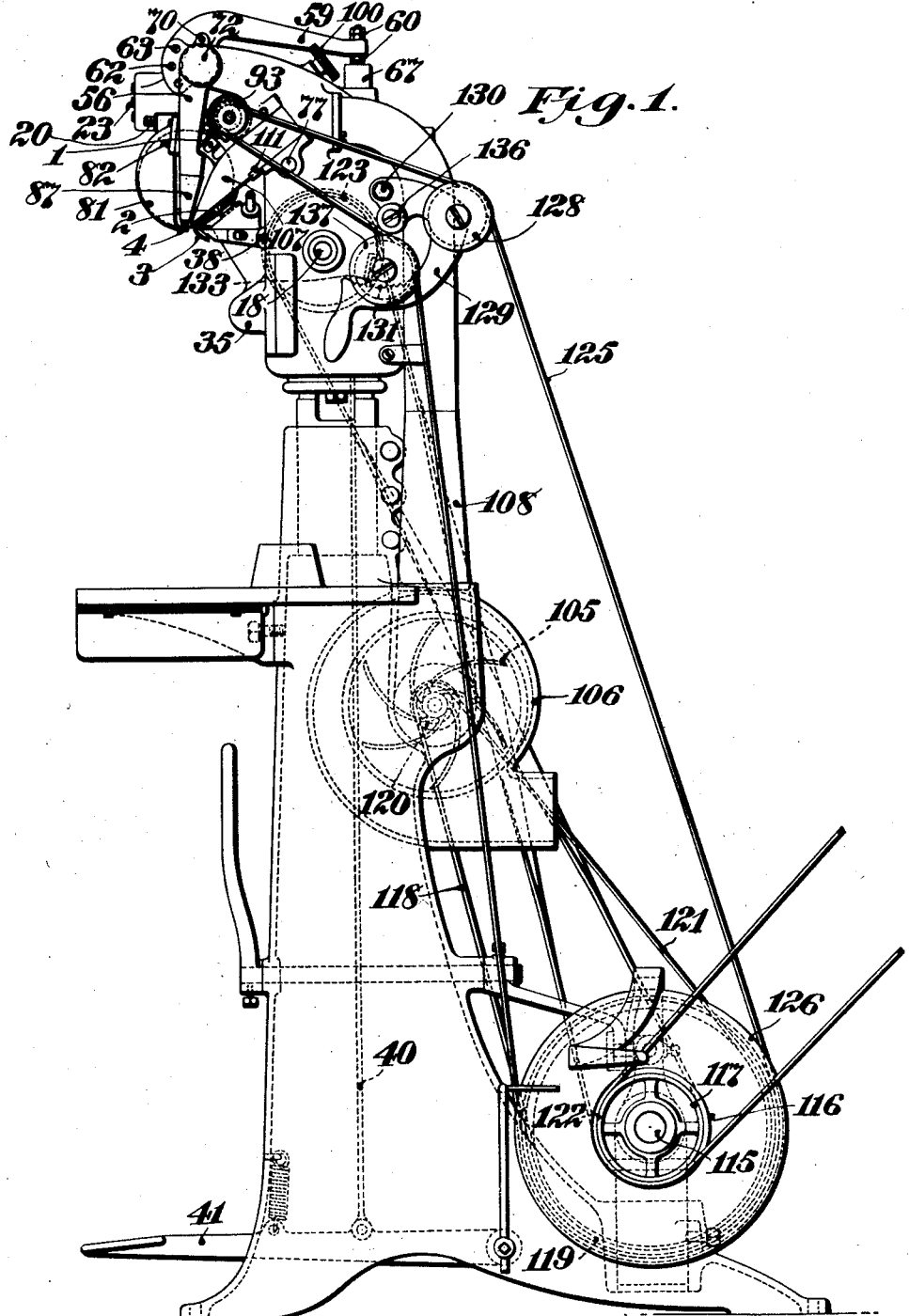

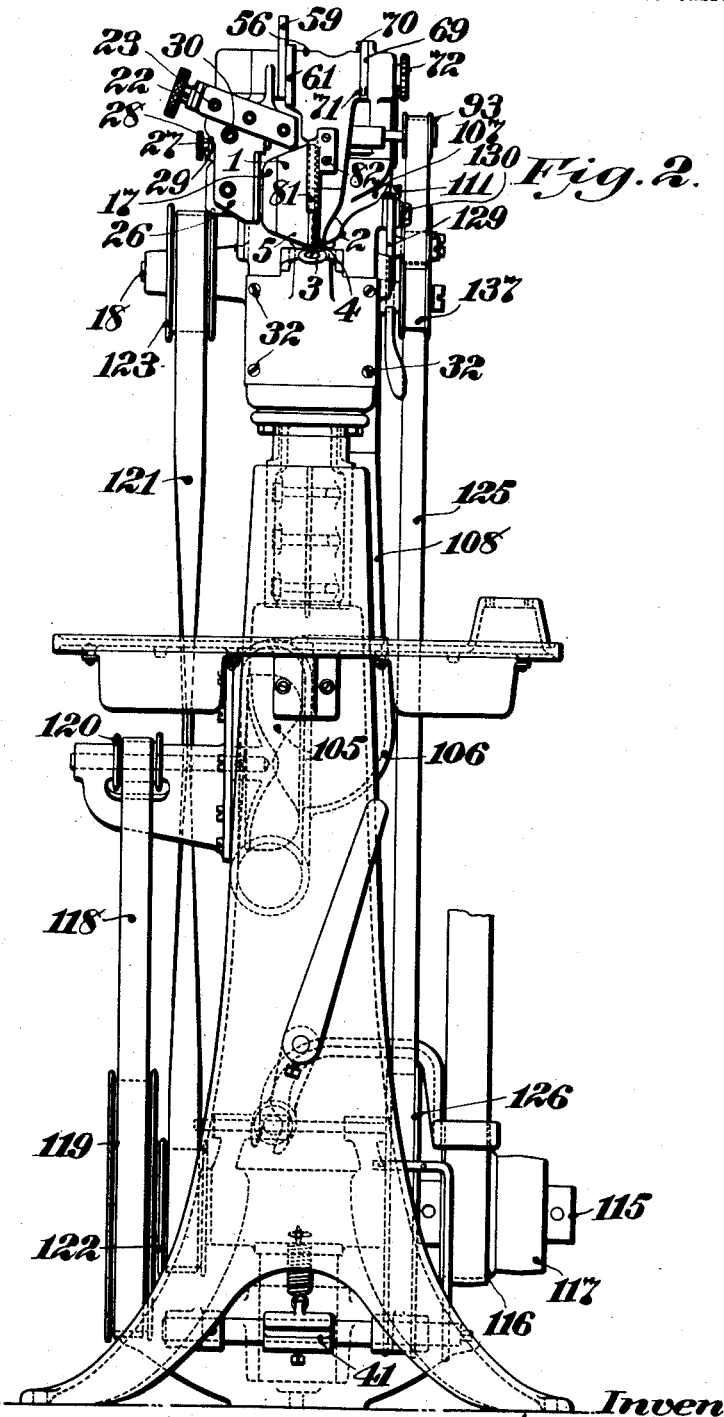

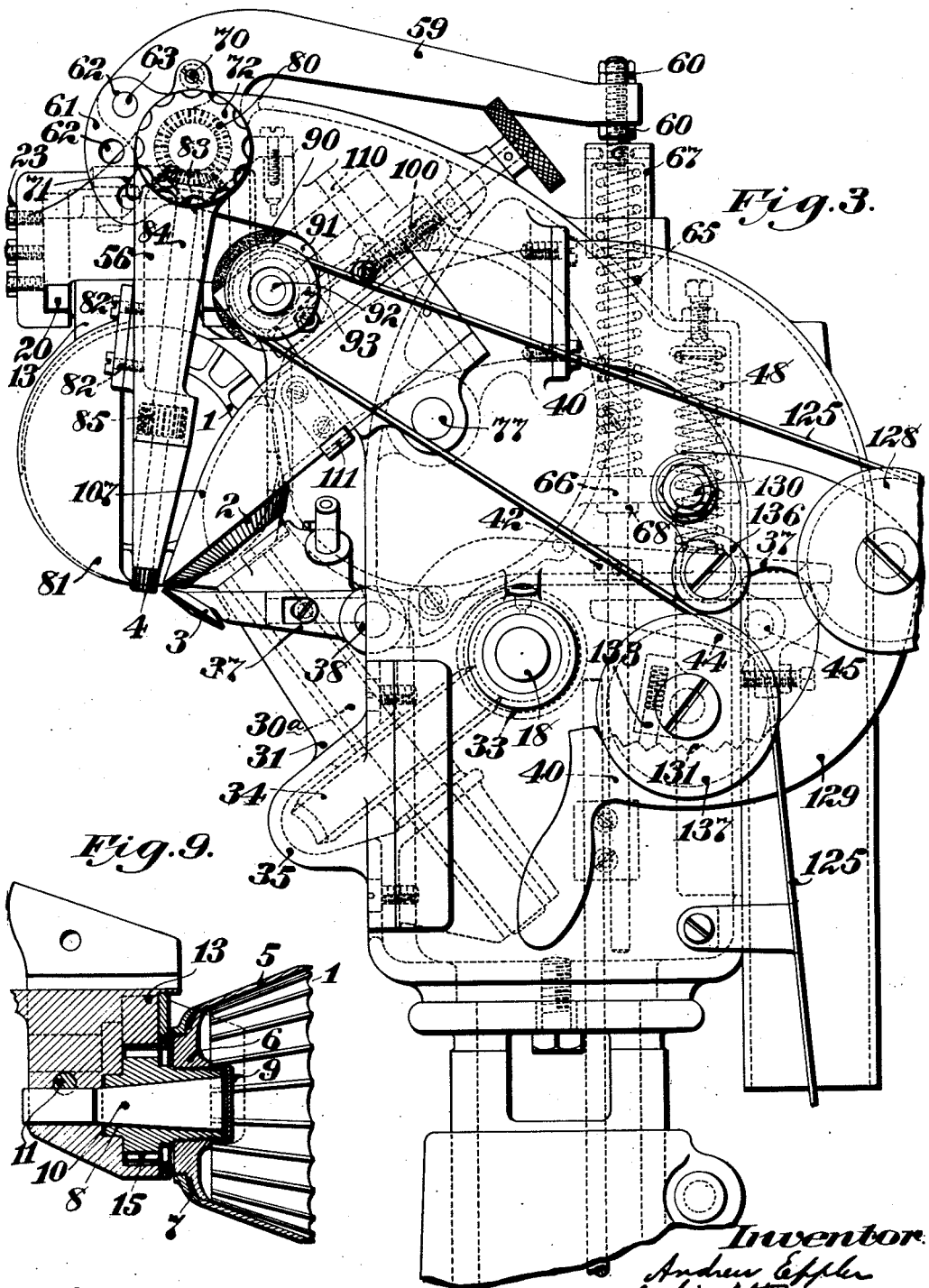

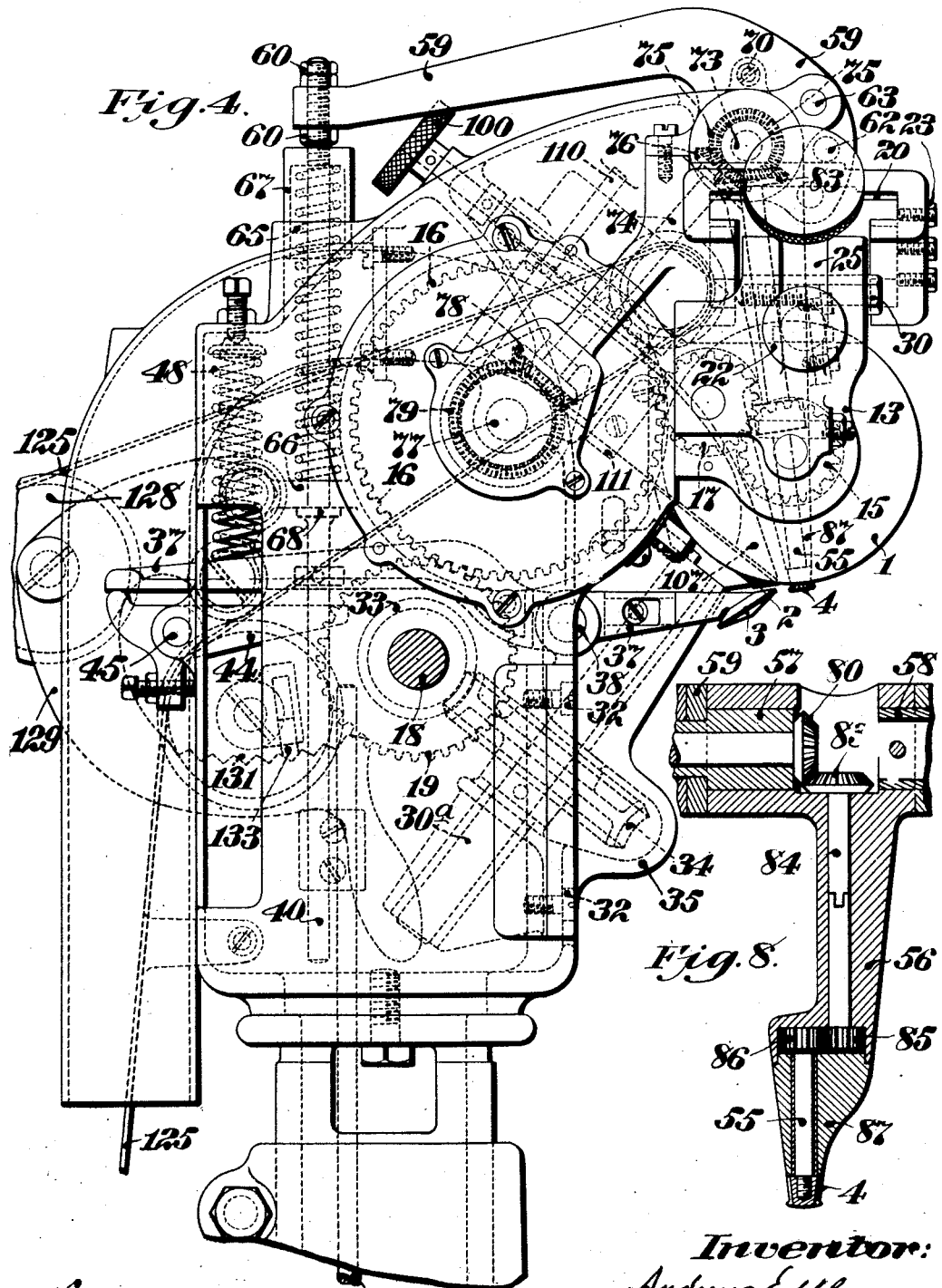

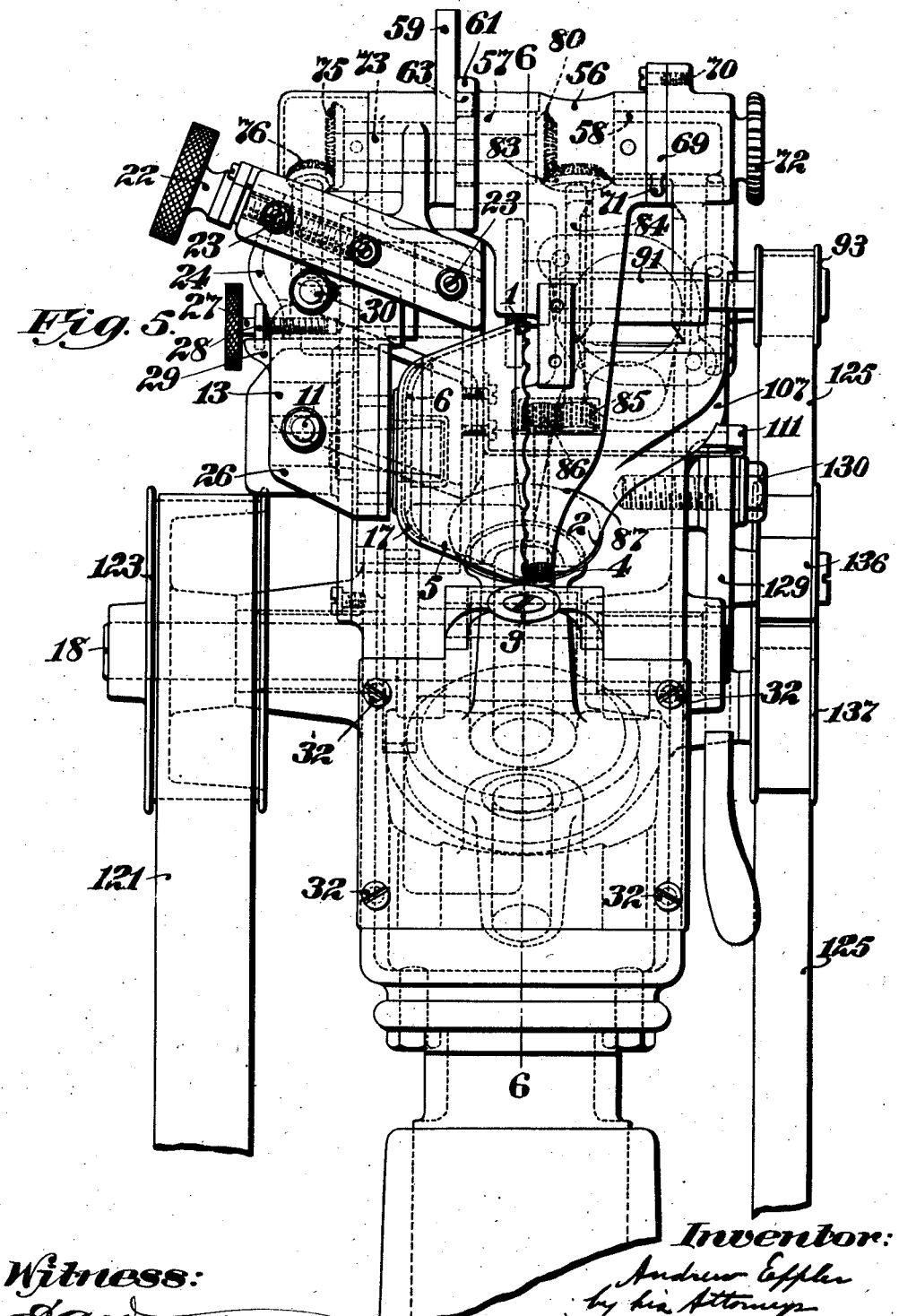

UNITED STATES PATENT OFFICE.

ANDREW EPPLER, OF LYNN, MASSACHUSETTS, ASSIGNOR TO UNITED SHOE MACHINERY COMPANY, OF PATERSON, NEW JERSEY, A CORPORATION OF NEW JERSEY.

INSEAM-TRIMMING MACHINE.

1,226,872.     Specification of Letters Patent.     Patented May 22, 1917.

Application filed March 23, 1916. Serial No. 86,207.

*To all whom it may concern:*

Be it known that I, ANDREW EPPLER, a citizen of the United States, residing at Lynn, in the county of Essex and State of Massachusetts, have invented certain new and useful Improvements in Inseam-Trimming Machines; and I do hereby declare the following to be a full, clear, and exact description of the invention, such as will enable others skilled in the art to which it appertains to make and use the same.

The present invention relates to upper trimming machines and more particularly to machines of this type employed for trimming the inseams of welt shoes.

The object of the present invention is to provide an inseam trimming machine having an improved construction and arrangement of parts coöperating in an efficient manner to perform the work for which the machine is designed.

With this object in view the several features of the invention consist in certain novel features of construction, combinations and arrangements of parts hereinafter described and claimed, the advantages of which will be apparent to those skilled in the art from the following description.

In the accompanying drawings illustrating the preferred form of the invention; Figure 1 represents a side elevation of an inseam trimming machine embodying the several features of the invention; Fig. 2 is a front elevation of the machine shown in Fig. 1; Fig. 3 is a right hand side elevation of the head of the machine; Fig. 4 is a left hand side elevation of the head of the machine; Fig. 5 is a front elevation of the head of the machine; Fig. 6 is a section in elevation of the machine taken upon the line 6—6 of Fig. 5; Fig. 7 is a detail illustrating the grinding disk and actuating mechanism; Fig. 8 is a detail showing a section in elevation of the upper guide roll and actuating mechanism; and Fig. 9 is a detail showing a section of the trimming knife and mechanism for supporting and rotating the knife.

The machine shown in the illustrated embodiment of the invention is provided with a tubular knife 1 and coöperating members for guiding and feeding the work to the knife comprising a feed roll 2 having a frusto-conical periphery for engaging the welt and a dished or concaved upper face within which the trimming knife runs, and a frusto-conical presser roll 3 which is shaped to enter the crease between the upper and welt and presses the welt against the feed roll. The inner side of the inseam is engaged by a small corrugated roll 4 which rotates about a substantially vertical axis and is so arranged that its lower end acts as a channel guide engaging with the sole in close proximity to the inner side of the seam and accurately positioning the sole with relation to the cutting edge of the knife. The roll not only acts as an inside guide for gaging the depth of cut, but also acts to lift and guide the lining and upper as they approach the cutting point.

The tubular trimming knife 1 has a tapered periphery which rotates in close proximity to the upper surface of the feed roll 2. The knife consists of a tapered hollow shell 5, see Fig. 9, which is secured to the tapered periphery of a hub 6 by a clamping ring 7 threaded to the hub behind the shell and acting to force the shell tightly upon the hub. The hub is threaded upon a rotary bearing 8 and is provided with an operating nut 9 at its front end. The bearing 8 is journaled upon the tapered end of a stud shaft 10 secured in a head 13 through a clamp bolt 11. The bearing is provided with a gear 15 operatively connected with a large gear 16 through an intermediate gear 17, as shown clearly in Fig. 4. The large gear is connected with the main shaft 18 of the machine through a driving pinion 19 secured to the shaft 18 and meshing with the gear. The head 13 carrying the trimming knife has provision for adjustment to position the knife properly in operative relation to the work guiding and feeding members and to position the knife as the cutting edge is ground away. To this end the head 13 is supported at its upper end in an inclined T slot 20 formed in the machine frame and is adjusted by a rotary member 22 threadedly engaging with the upper portion of the head and retained against longitudinal movement relative to the machine frame. The head is locked in adjusted position by a plurality of clamping bolts 23 threadedly mounted in the side of the guideway 20. In order to permit of a horizontal adjustment of the knife the head is divided into an upper portion 24 provided with a depending T-shaped flange 25 upon which a lower portion 26 is slidingly supported for movement in a horizontal direction. A relative adjustment of the two parts of the head is obtained by a rotary adjusting member 27 threadedly engaging with the upper portion 24 of the head and having a collar 28 which engages with a slotted lip 29 formed upon the lower portion 26 of the head. The two portions of the head are normally retained against relative movement by a clamping bolt 30 which passes through an elongated slot formed in the flange 25 and is arranged to bind the slotted upper portion of the part 26 against the flange. Owing to the provision of these two adjustments the knife may be positioned initially in operative relation to the work guiding and feeding members and this position may be maintained as the cutting edge of the knife is ground away, the inclined slot causing the knife to be automatically adjusted to initial position as the diameter of the knife is reduced.

The feed roll 2 is rotated during the operation of the machine to coöperate in feeding the work to the knife and to this end is secured to the upper end of an inclined shaft 30ª journaled in a head 31 which is secured to the front of the machine frame by a plurality of threaded members 32. The feed roll shaft is actuated from the main shaft of the machine through a worm gear 33 secured to the main shaft and meshing with a worm wheel 34 secured to the feed roll shaft, as shown clearly in Fig. 6. It will be noted from an inspection of the drawings that the head 31 is provided with a gear receiving portion 35 which completely incloses and guards the worm 34.

The presser roll 3, as stated heretofore, engages in the crease beneath the welt and coöperates with the feed roll to feed the work to the knife. It is desirable in order to facilitate the introduction of the work to the machine and its removal therefrom to cause a relative movement of separation between the feed roll and presser roll and to this end the presser roll is journaled upon one end of a supporting lever 37 which is pivoted upon the head 31 at 38 and is connected at its opposite end with a treadle rod 40. Upon the depression of a treadle 41 connected to the rod at its lower end a collar 42 secured to the rod 40 engages with the bifurcated end of an intermediate lever 44 pivoted to the back of the machine frame at 45 and having its opposite end arranged in operative relation to the end of the lever 37. With this construction the application of a comparatively small pressure upon the treadle serves to rock the lever 37 and depress the roll 3, the short lever 44 and the longer lever 37 forming a series of connections for multiplying the force applied to the treadle. The presser roll is normally retained in operative position to firmly clamp the welt against the feed roll by a compression spring 48 interposed between the machine frame and the upper face of the lever 37, as shown clearly in Fig. 6. The position of the presser roll may be varied as desired through the provision of an adjusting screw 50 threadedly supported in a depending flange 51 formed upon the lever 44 and having its free end engaging with the back of the machine frame.

The guide roll 4 engaging in the channel of the sole is secured to the lower end of a shaft 55 journaled in a head 56 which is pivotally supported at its upper end upon the machine frame in order that the roll may be moved out of operative relation to the knife to permit the convenient insertion and removal of work. To this end the upper end of the head 56 is supported at opposite sides upon shafts 57 and 58, respectively, projecting from bearings formed in the machine frame. In the illustrated embodiment of the invention the head 56 is connected with the treadle to cause a simultaneous separation of the guide roll 4 and presser roll 3. To this end the head is connected with the upper end of the treadle rod 40 through an actuating lever 59 journaled adjacent one end upon a reduced portion of the stud shaft 57, as shown clearly in Fig. 8 and adjustably connected at its opposite end to the treadle rod through oppositely disposed lock nuts 60. The actuating lever 59 is detachably connected to the head through the provision of an arm 61 formed integrally with the upper portion of the head 56 and provided with a series of apertures 62, one of which is engaged by a pin 63 projecting laterally from the actuating lever 59, as shown clearly in Fig. 3 of the drawings. The actuating lever and head are normally connected, as shown in Fig. 3, with the pin 63 engaging with the uppermost aperture, and upon a depression of the treadle the head is swung outwardly to separate the guide and presser rolls. The guide roll is normally maintained in an operative position by a coil spring 65 surrounding the upper end of the treadle rod and interposed between a stationary strut 66 and a tubular thrust member 67 threadedly secured to the upper end of the treadle rod. The upward movement of the treadle rod under the action of the spring 65 is limited by the engagement of a collar 68 with the under side of the strut 66. In order to permit the head and guide roll to be conveniently moved into an inoperative position when it is desired to expose the interior of the knife, the head has provision for a lateral movement to disconnect the head and actuating lever, permitting the head to be swung upwardly. To this end the head is normally maintained in the lateral position shown in Fig. 5 through a spacing member 69 supported at its upper end upon a pivot pin 70 and interposed between one side of the head 56 and the coöperating bearing formed upon the machine frame. When it is desired to disconnect the head from the actuating lever the spacing member is swung out of operative position through the engagement of a finger hold 71 and the head 56 is then free to move bodily until the side of the head engages with the coöperating bearing. During this movement the head slides upon the stud shaft 57 and the hollow shaft 58 slides in the bearing formed in the machine frame. In order to facilitate the movement of the head the end of the shaft 58 projecting from the machine frame is provided with a knurled handle 72 which may be employed to disconnect the head from the actuating lever and to swing the head into an inoperative position. After the head has been swung upwardly it may be retained in its elevated position by engagement of one of the lower apertures 62 with the pin 63. The guide roll is continuously rotated during the operation of the machine through a shaft 73 journaled concentrically in the shaft 57 and connected to an inclined shaft 74 through intermeshing beveled gears 75 and 76, respectively. The inclined shaft 74 is operated from the shaft 77 carrying the large gear 16 through intermeshing beveled gears 78 and 79. The opposite end of the shaft 73 is connected with the shaft 55 through intermeshing beveled gears 80 and 83, intermediate shaft 84, and intermeshing spur gears 85 and 86, respectively secured to the shaft 84 and the shaft 55. The head 56 is provided with a lower portion 87 which may be adjusted relative to the main portion of the head and in which the shaft 55 is journaled. It will be noted from an inspection of Fig. 8 that the intermediate shaft 84 is conveniently made in two parts to permit the gears 83 and 85 to be assembled upon the shaft, the inner ends of the two parts of the shaft interlocking when the shaft is assembled upon the head. The trimming knife is inclosed and guarded by a stationary guard flange 81 which is secured to the head 56 by threaded members 82, as shown clearly in Fig. 3.

The cutting edge of the knife is sharpened by a rotary grinding disk 90 supported upon a head 91 adjacent to the knife edge. The grinding disk is continuously rotated and is reciprocated to secure a uniform grinding action on the knife. To this end the disk is secured upon one end of a shaft 92 having a driving pulley 93 secured to its opposite end and provided with a worm gear 94 which meshes with a worm wheel 95 journaled in the head 91 and having an eccentric bushing 96 rotating within a block 97 which is slidingly supported in parallel ways formed in a carriage 98. The carriage 98 forms a bearing for the shaft 92 and serves to impart a slow reciprocating movement to the grinding disk as it is rotated. It will be noted that the reciprocating movement of the carriage causes a like movement of the connections operated by the driving pulley 93 but this movement is not sufficient to interfere with the operation of the device. The grinding disk is moved into and out of operative relation to the knife edge by an adjusting member 100 journaled upon the upper portion of the machine frame and threadedly engaging with the sliding head 91 which is supported in inclined ways formed in the machine frame to cause a movement of the grinding disk in a direction substantially radial to the knife.

The dust and chips are removed from the interior of the knife by a suction fan 105 journaled in a fan casing 106 and connected with a suction nozzle 107 through an air passage indicated generally at 108. As seen clearly in Fig. 3 of the drawings the suction nozzle overlies the interior of the knife and the feed roll adjacent the cutting point and serves to remove chips from the knife, dust, and particles of emery freed by the action of the grinding disk. The suction nozzle aids in guiding the work to the knife and is conveniently arranged to be swung into an inoperative position in order to permit of convenient access to the interior of the knife. To this end the suction nozzle is connected at its upper end to the machine frame through a pivot pin 110 and is retained in operative relation to the knife by a resilient arm 111 projecting laterally from the machine frame and having an inturned end which engages behind the suction nozzle when in operative position, as shown clearly in Fig. 5.

The machine is actuated from a power shaft 115 journaled in the lower portion of the machine frame and having the usual tight and loose pulleys indicated at 116 and 117, respectively. The exhaust fan is actuated directly from the power shaft through a driving belt 118 and pulleys 119 and 120 secured respectively to the power shaft and to the fan shaft. The main shaft 18 of the machine is actuated from the power shaft through a driving belt 121 and pulleys 122 and 123 secured respectively to the power shaft and to the main shaft of the machine. The grinding disk 90 is operated from the power shaft through a belt 125 driven from a pulley 126 secured to the power shaft and passing over the pulley 93 secured to the shaft of the grinding disk. The driving connection between the power shaft and grinding disk is established by tightening the driving belt 125. The idler pulley 128 is journaled upon a curved arm 129 pivoted to the upper portion of the machine frame at 130 and having a serrated lower portion 131 positioned in operative relation to a spring pressed latch pin 133. Upon swinging the arm to move the idler pulley outwardly the belt is tightened to cause a rotation of the grinding disk. In order to completely stop the movement of the driving belt when loose a brake member 136 is supported upon the lever 129 and is arranged to bind the driving belt against an idler pulley 137 when the curved arm is moved in a direction to slacken the tension upon the driving belt. With this construction the movement of the curved arm in opposite directions causes the operation of the grinding disk through the belt, or completely stops the belt to render the grinding disk inoperative, the spring pressed latch pin retaining the curved arm in any position to which it is moved.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. An inseam trimming machine, having in combination, a rotary trimming knife, work guiding and feeding members coöperating with the knife, and mechanism for supporting the knife having provision for adjustment in a direction inclined to the axis of the knife and in a direction substantially parallel to the axis of the knife.

2. An inseam trimming machine, having in combination, a rotary trimming knife, a feed roll, a guide roll coöperating with the feed roll, a head supporting the guide roll, an actuating lever, and connections between the head and actuating lever having provision for adjustment to vary the angular position of the head with relation to the lever.

3. An inseam trimming machine, comprising, a rotary trimming knife, a presser roll engaging beneath the welt, a lever supporting the presser roll, a treadle rod, and an intermediate lever connecting the treadle rod and presser roll lever to actuate the latter upon a depression of the treadle rod.

4. An inseam trimming machine, comprising, a rotary trimming knife, a feed roll, a presser roll coöperating therewith, a guide roll engaging in the channel of the shoe, a treadle rod, an actuating lever connecting the treadle rod and guide roll, a pivoted lever carrying the presser roll upon one end, and connections between the presser roll lever and treadle rod to swing the lever about its fulcrum and cause a movement of separation of the presser roll lever and guide roll upon a depression of the treadle rod.

5. An inseam trimming machine, comprising, a rotary trimming knife, a grinding disk supported in operative relation to the knife, means for rotating the grinding disk, and mechanism operated thereby for imparting a reciprocatory movement to the disk.

6. An inseam trimming machine, having in combination, a rotary trimming knife, a member engaging with one side of the welt, a pivoted lever, a roll journaled upon one end of the lever and engaging with the opposite side of the welt, a treadle rod, and connections between the opposite end of the lever and treadle rod.

7. An inseam trimming machine, comprising, a lever pivoted between its ends, a presser roll supported upon one end of the lever, a treadle rod, and a shorter pivoted lever interposed between the treadle rod and presser roll lever and connected with the treadle rod and presser roll lever at its opposite ends.

8. An inseam trimming machine, comprising, a trimming knife, work guiding and feeding members, and a chip ejecting chute positioned in front of the knife and having a mouth arranged in proximity to the operative point of the knife having provision for movement away from the knife.

9. An inseam trimming machine, comprising a trimming knife, a pivoted chip ejecting chute positioned in front of the knife, and means for locking the chute in operative position.

10. An inseam trimming machine, comprising, a rotary trimming knife, a head journaled at its upper end, a guide roll supported by the head in front of the knife, an actuating lever detachably connected with the head, means for locking the head in engagement with the actuating lever in one of a plurality of different positions, and connections for operating the lever.

11. An inseam trimming machine, comprising, a trimming knife, a head, a guide roll supported upon the lower end of the head, an arm projecting from the head and provided with a series of apertures, an actuating lever, and a pin projecting from the actuating lever and arranged to be received in any one of the series of apertures.

12. An inseam trimming machine, comprising, a rotary trimming knife, a guide roll, a knife guard, and a chip ejecting chute positioned in front of the knife and having provision for movement away from the knife to permit access to the interior of the knife.

13. An inseam trimming machine, comprising, a trimming knife, a head fulcrumed upon the machine frame at its upper end and having provision for a lateral movement, a guide roll carried by the head, an actuating lever, detachable connections between the lever and head, and a pivoted spacing member for normally maintaining the head operatively connected with the lever.

14. An inseam trimming machine, comprising, a head fulcrumed upon the frame at its upper end and having provision for lateral movement, an actuating lever, an arm projecting from the head and having a series of apertures, a pin projecting from the lever and arranged to engage in any one of the series of apertures, and a spacing member for normally maintaining the pin in engagement with one of the apertures arranged to permit a lateral movement of the head to disengage the head from the actuating lever.

15. An inseam trimming machine, comprising, a trimming knife, a rotary shaft, a grinding disk secured to one end of the shaft and supported in operative relation to the trimming knife, a sliding head supporting the shaft and having guideways extending transversely of the shaft, an eccentric member for reciprocating the head, and connections between the eccentric member and shaft.

16. An inseam trimming machine, comprising, a trimming knife, a rotary shaft, a grinding disk secured to one end of the shaft, a sliding head within which the shaft is journaled having guideways extending transversely of the shaft, a block slidingly supported in the guideways, an eccentric bushing rotating within the block, and a worm gearing connecting the shaft and eccentric bushing.

17. An inseam trimming machine, comprising, a rotary trimming knife, a rotary grinding disk supported in operative relation to the knife, a driving belt for actuating the grinding disk, and a single manually controlled lever constructed and arranged in one position to cause a rotation of the grinding disk and in another position to prevent rotation of the grinding disk.

18. An inseam trimming machine, comprising, a rotary trimming knife, a grinding disk supported in operative relation to the knife, means for actuating the grinding disk including a driving belt, a guide pulley over which one side of the belt passes, and a manually controlled lever arranged in one position to bind one side of the belt against the drive pulley to prevent rotation of the grinding disk and in another position to engage the opposite side of the belt to tighten the belt and actuate the grinding disk.

ANDREW EPPLER.